Jan. 19, 1971    P. LEUTWYLER ET AL    3,556,680
AERODYNAMIC PRESSURE-WAVE MACHINE
Filed Jan. 13, 1969
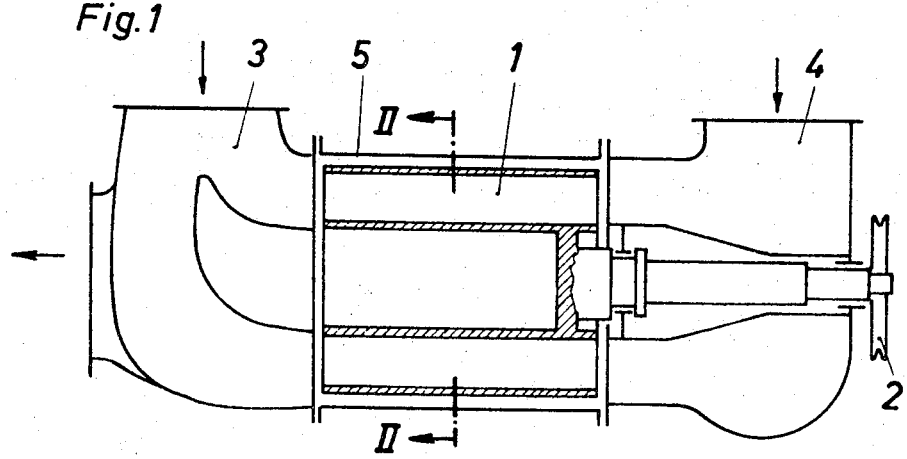
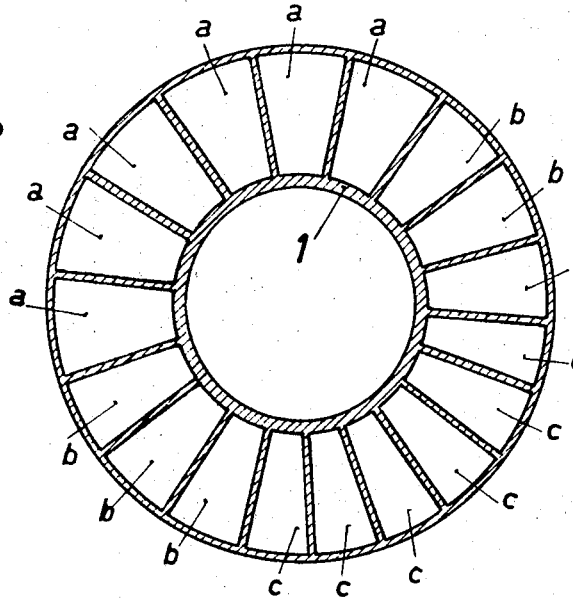
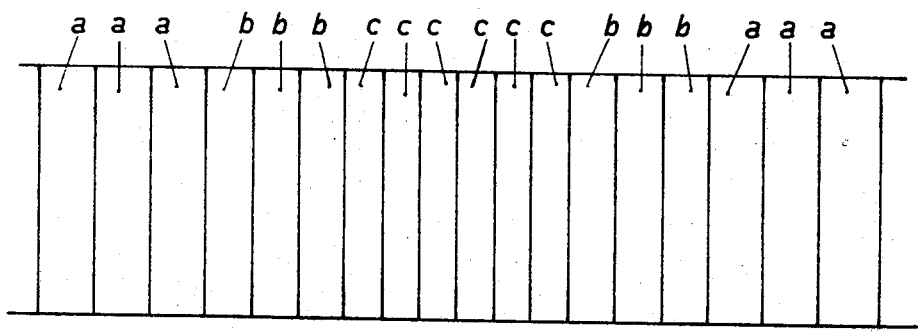
Inventors
Paul Leutwyler
Alfred Wunsch
By Pierce, Scheffler & Parker
Attorneys United States Patent Office 3,556,680
Patented Jan. 19, 1971

3,556,680
AERODYNAMIC PRESSURE-WAVE MACHINE
Paul Leutwyler, Auenstein, and Alfred Wunsch, Wettingen, Switzerland, assignors to Aktiengesellschaft Brown Boveri & Cie, Baden, Switzerland, a joint-stock company
Filed Jan. 13, 1969, Ser. No. 790,781
Claims priority, application Switzerland, Jan. 22, 1968, 952/68
Int. Cl. F04f 11/00; F01d 5/10; F02c 3/02
U.S. Cl. 417—64
6 Claims

ABSTRACT OF THE DISCLOSURE

An aerodynamic pressure wave machine in which one gas is expanded while another is compressed operates with a reduced noise level by arranging the cells of the cell wheel into cell groups extending in the circumferential direction. The cells of each group are of the same width as measured in a circumferential direction but the cells of adjacent groups have different widths.

---

The present invention relates to an arrangement for reducing the noise of the rotational sound which occurs in aerodynamic pressure-wave machines, and whereof the frequencies are determined by the number of cells in the cell wheel and the speed thereof.

In aerodynamic pressure-wave machines, expansion of a gas transmits energy to another gas, which is as a result compressed. The action of expansion and compression takes place under the effect of expansion and compression waves in elongated cells open at the front which are arranged on a rotor and move past inlet and outlet ducts in the stator. An optimum width in the circumferential direction which is constant for all the cells, and which also defines the number of cells, may be worked out from throttle-losses occurring upon inward and outward flow and from friction and heat-transfer.

The periodical impingement of flow on the cell-walls upon inlet to the cell wheel and also the periodical outflow from the cells with a certain velocity profile are attended by a great deal of noise. These noises comprise individual frequencies corresponding to the product of the number of cells in the cell wheel and the rotational speed thereof and to multiples of this product. The noise is a great nuisance since it is propagated outward through the inlet and outlet ducts in the stator and via the housing. The individual frequencies cause the noises to be perceived as a shrill whistle, which is a most unpleasant and disturbing sensation even if silencers are used.

In the case of radial fans in electrical machines, it is known to combine the fan-blades in a plurality of groups within which all the blades are at the same pitch while the mutual pitch between groups are smaller than the blade-pitch within a group. This arrangement does not enable any appreciable reduction in the noises to be attained.

It is furthermore known (German specification Das. 1,253,402) in the case of radial fans for similar machines to make the differences between the varying blade-pitches as large as possible, and to distribute the blades as non-uniformly as possible over the circumference. Such a device, wherein the maximum blade-pitch is almost three times as great as the minimum pitch cannot be transferred to aerodynamic pressure-wave machines because they function in a manner which is not comparable and which involves quite different presumptions, and are therefore subject to quite different conditions, comprising among other things keeping as near as possible to an optimum cell-width.

One way of reducing noises in pressure-wave machines as disclosed in British patent specification 920,908 resides in locating the frequency of the rotational sound above the audible range. At the speeds usual for such machines, location above the audible range would require the number of cells to be made so high that there would be a sharp rise in losses due to heat-transfer and friction in the finely subdivided cellular wheel. It would then no longer be possible to operate the machine at satisfactory efficiency.

The present invention relates to means for reducing the noises of an aerodynamic pressure-wave machine and making them more agreeable, while avoiding the disadvantages discussed above. According to the invention, the solution to this problem resides in that the individual frequencies of the rotational sound are resolved into ranges of frequencies of differing amplitudes. This can be done by a device wherein the cells of the cell wheel, which are of at least two different widths, are combined to form groups of cells of equal width.

Resolution of the individual frequencies into frequency-ranges is possible if the cells of the rotor are made of differing width in circumferential direction. Since it is necessary to keep as near as possible to the optimum cell-width in a pressure-wave machine, a variation in cell-width must not involve any excessive departure of the chosen values from the optimum value. The departures must thus remain as small as possible so that the characteristics and efficiency of the pressure-wave machine shall not be noticeably impaired.

In order to manage with the smallest possible number of differing cell-widths, it is necessary to arrange the cells of the rotor in small groups of cells of equal width. Even in the case of a small variation of cell-width, suitable combinations of such groups result in a considerable reduction in the main amplitude of an individual frequency which would be set up were the cell-width normal, i.e., constant, and a multiplicity of additional frequencies of small amplitudes.

The largest reduction in the amplitudes of oscillation for the smallest variation in cell-width results from subdividing all the cells of a cell wheel into main groups each comprising two or more groups with the same number of differing cell-widths. The cell-widths decrease from group to group in a first main group and increase again from group to group in the following main group in accordance with the scheme:

*aaa bbb ccc/ccc bbb aaa*

In this connection, *b* symbolizes a normal or mean cell-width, *a* a larger one and *c* a smaller one. The cells *aaa bbb ccc* form the first main group, and the cells *ccc bbb aaa* the second main group. For the purpose of clearer limitation, the two main groups are separated from one another in this example by an oblique stroke (/).

In order to increase the effect, it is advantageous to take one member from the groups of mean cell-width and arrange it at the end of a main group in order to separate from one another the two groups of equal cell-width meeting at this point, for example, in the case of three different cell-widths in accordance with the scheme:

*aaa bb ccc b ccc bb aaa b* or in the case of four widths;

*aaa bb ccc ddd b ddd ccc bb aaa b* and also;

*aaa bbb cc ddd c ddd cc bbb aaa c*

In this connection, similarly to before, *a* and *d* symbolize the cell-widths exhibiting the greater departures from the normal cell-width, and *b* and *c* the cell-widths exhibiting the smaller departures.

It may also be expedient to split up two groups of mean cell-width in accordance with the scheme:

*aaa bb cc b ddd c ddd b cc bb aaa c*

In the case of pressure-wave machines, it is relatively easy to compensate for any unbalance which may arise. At least four main groups are necessary in order that the cell-walls may be symmetrically arranged over the circumference of the wheel without any unbalance. However, if a corresponding number of cell-widths is not available, any numbers of main groups or parts thereof may be consecutively arranged without detriment to the acoustic effect, for example, in accordance with the scheme:

*aaa bb ccc ddd b ddd ccc bb aaa b ddd ccc b aaa b*

All of the foregoing examples set out of arrangements according to the invention of the cells of a cell wheel of an aerodynamic pressure-wave machine enable the main amplitude of the oscillations to be considerably reduced. Even a departure of +5% from the normal cell-widths yields a considerable improvement, and a departure of +10% makes it possible to attain a reduction up to 40–50% of the amplitudes of oscillation which would otherwise be set up in the case of normal cell-width.

However, the frequencies which then newly occur are often in a limited range if it is required to depart only slightly from the mean width. The noise of the rotational sound is nevertheless more agreeable if the whole audible range is occupied with frequencies of small amplitudes. Individual groups of frequencies which are separated from one another and not linked to form a band can still have a disturbing effect. The frequency-ranges could be widened and the gaps filled up if a greater variation in cell-widths were allowed. However, this would involve a greater departure from normal cell-width in the case of a larger number of cells, which would lead to disadvantages of another kind. A favorable solution resides in imparting a greater departure from normal cell-width to only very few cells of the wheel, for example two, in order that the oscillations which as a result arise in the flowing medium shall occupy those frequency ranges which are still free. The following scheme may serve as an example:

*aaa bb ccc ddd e ddd ccc bb aaa f aaa bb ccc ddd*

In this case, the cell-widths $a$ may differ by +10%, $b$ by +3%, $c$ by −3%, $d$ by −10%, $e$ by +20% and $f$ by −20% from the normal cell-width. The effect on the manner in which the machine acts is only slight, but the desired acoustic effect is nevertheless attained.

An example of embodiment of the invention is illustrated in the accompanying drawing, wherein:

FIG. 1 shows a longitudinal section through a aerodynamic pressure-wave machine, FIG. 2 shows the cell wheel of FIG. 1 sectioned along II—II and on a larger scale, FIG. 3 shows a development of the periphery of the cell wheel according to FIG. 1.

With reference now to FIG. 1, the cell wheel 1, which is driven at pulley 2, runs in a stator consisting essentially of the housing 3 at one end of the cell wheel for the medium to be compressed, the housing 4 at the other end of the cell wheel for the expanding medium, and the shroud 5 surrounding the cell wheel to close the cells in a peripheral direction. The housings contain the inlet and outlet ducts (not shown) for the two media, whereof the direction of flow are indicated by arrows.

In FIG. 2, the cell wheel 1 is illustrated in radial section. The cells are combined in groups of cells are of constant cross-section throughout their length and of equal width, $a$, $b$ and $c$ designating cells of differing width. The differing widths may be even more clearly recognized in the development of the cellular wheel according to FIG. 3. The grouping of the cells illustrated corresponds to the first of the examples shown above.

We claim:

1. An arrangement for reducing the noise of the rotational sound which occurs in an aerodynamic pressure wave machine consisting of a rotor which mainly comprises a hub and a shroud with radial interconnections thus forming in said rotor axial cells of constant cross sectional area over their length being peripherally closed and said pressure wave machine having stators leading in a high-pressure stage fluid to the rotor to be expanded by means of pressure waves thus compressing another fluid which flows through high-pressure ducts of another stator part, said stator parts also having low pressure ducts leading low pressure fluid to and from said rotor, which comprises cell groups extending in the circumferential direction, the cells of each group being of the same width in the circumferential direction and the cells of adjacent groups being of different width.

2. An arrangement as defined in claim 1 wherein each of said cell groups consist of the same number of cells.

3. An arrangement as defined in claim 2 wherein at least two cell groups are combined to form a main group, and wherein the width of the cells decreases from group to group in a first main group, and increases again in a second main group.

4. An arrangement as defined in claim 2 wherein two neighboring cell groups are separated from one another by at least one cell of different width.

5. An arrangement as defined in claim 4 wherein one cell is taken from at least one group of mean cell width and arranged between two groups of a different cell width.

6. An arrangement as defined in claim 4 wherein the separating cell is of a width differing considerably from the widths of the remaining cells.

References Cited

UNITED STATES PATENTS

| 1,525,814 | 2/1925 | Lasche | 415—119 |
| 2,068,918 | 1/1937 | Kagi | 230—232 |
| 3,006,603 | 10/1961 | Caruso et al. | 230—127A |
| 3,194,487 | 7/1965 | Tyler et al. | 415—119 |
| 3,109,580 | 11/1963 | Kentfield | 230—69 |

FOREIGN PATENTS

| 502,615 | 4/1951 | Belgian | 415—119 |
| 165,330 | 4/1904 | Germany | 415—119 |

HENRY F. RADUAZO, Primary Examiner

U.S. Cl. X.R.

60—39.45; 415—119